(12) United States Patent
Kim et al.

(10) Patent No.: US 7,420,895 B2
(45) Date of Patent: Sep. 2, 2008

(54) SIGNAL DETECTION METHOD AND APPARATUS AND OPTICAL RECORDING AND/OR REPRODUCING APPARATUS USING THE SAME

(75) Inventors: Eun-goo Kim, Suwon-si (KR); Chun-gi Kim, Suwon-si (KR); Kyoung-hwan Park, Suwon-si (KR); Ji-hwan Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 582 days.

(21) Appl. No.: 10/746,147

(22) Filed: Dec. 29, 2003

(65) Prior Publication Data

US 2004/0223424 A1 Nov. 11, 2004

(30) Foreign Application Priority Data

Dec. 28, 2002 (KR) .............................. 2002-85905

(51) Int. Cl.
*G11B 7/00* (2006.01)
(52) U.S. Cl. ................... 369/44.28; 369/43; 369/44.37; 369/44.41
(58) Field of Classification Search .................. None
See application file for complete search history.

(56) References Cited

U.S. PATENT DOCUMENTS

| 5,708,636 | A | * | 1/1998 | Takahashi et al. | ......... 369/44.41 |
| 5,764,605 | A | * | 6/1998 | Zucker et al. | ............ 369/44.29 |
| 5,812,505 | A | * | 9/1998 | Shimoda et al. | .......... 369/44.35 |
| 6,778,475 | B2 | * | 8/2004 | Izumi et al. | .............. 369/44.41 |
| 2001/0019520 | A1 | * | 9/2001 | Uemura et al. | ........... 369/44.23 |

* cited by examiner

*Primary Examiner*—Joseph Feild
*Assistant Examiner*—Tawfik Goma
(74) *Attorney, Agent, or Firm*—Staas & Halsey LLP

(57) ABSTRACT

A method and apparatus for detecting a signal to determine on-track/off-track and/or a track cross direction, using a detection signal corresponding to a reflected main light beam and detection signals respectively corresponding to reflected first and second sub light beams, and an optical recording and/or reproducing apparatus using the same are provided. When detection signals respectively corresponding to one side portions, in a direction corresponding to a radial direction of the optical information storage medium, of the respective main light beam and first and second sub light beams are referred to as a first main signal, a first sub signal, and a second sub signal, respectively, the method and apparatus include obtaining a first operational signal, which is used to determine on-track/off-track and/or a track cross direction, by performing a subtraction on the combination of the first and second sub signals, and the first main signal.

24 Claims, 12 Drawing Sheets

FIG. 2
(PRIOR ART)
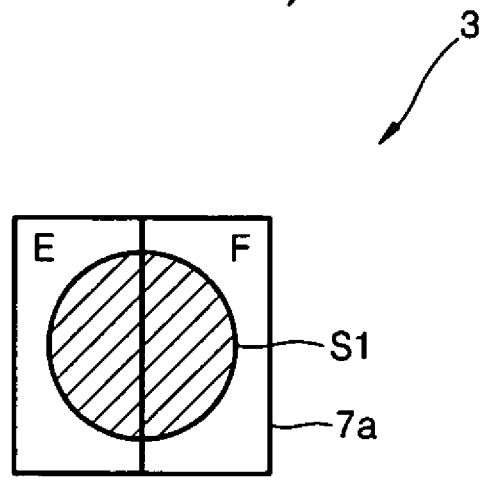
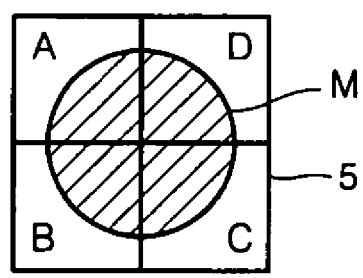
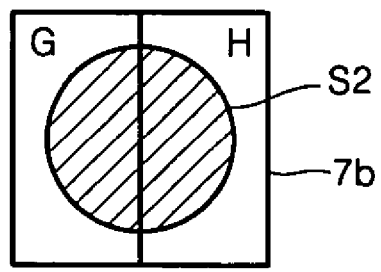
R DIRECTION

SIGNAL DETECTION METHOD AND APPARATUS AND OPTICAL RECORDING AND/OR REPRODUCING APPARATUS USING THE SAME

CROSS-REFERENCE TO RELATED APPLICATIONS

This application claims the priority of Korean Patent Application No. 2002-85905, filed on Dec. 28, 2002, in the Korean Intellectual Property Office, the disclosure of which is incorporated herein by reference.

BACKGROUND OF THE INVENTION

1. Field of the Invention

The present invention relates to a signal detection method and apparatus and an optical recording and/or reproducing apparatus using the same, and more particularly, to a signal detection method and apparatus for performing an on-track control and/or detecting a track crossing direction, and an optical recording and/or reproducing apparatus using the same.

2. Description of the Related Art

An optical recording and/or reproducing apparatus performs a tracking operation to allow an optical pickup to accurately follow tracks on an optical information storage medium, for example, an optical disc.

A differential push-pull (DPP) method is used for tracking. In the DPP method, a tracking error signal is detected using a 4-division main photodetector and first and second 2-division sub photodetectors. An optical pickup used for an optical recording and/or reproducing apparatus that detects a tracking error signal using the DPP method radiates a main light beam M and first and second sub light beams S1 and S2 onto an optical disc 1, as shown in FIG. 1. The optical pickup includes a photodetector 3 which separately receives each of the main light beam M and the first and second sub light beams S1 and S2, which have been reflected from the optical disc 1, as shown in FIG. 2.

The photodetector 3 includes a 4-division main photodetector 5 which divides and receives the main light beam M, and first and second 2-division sub photodetectors 7a and 7b which divide and receive the first and second sub light beams S1 and S2, respectively.

Regardless of whether the optical disc 1 is a read-only memory (ROM) type or a land/groove type, because both an area 1a in which information is recorded and an area 1b in which information is not recorded can be regarded as tracks, hereinafter the area 1a in which information is recorded is referred to as a recording track and the area 1b in which information is not recorded is referred to as a non-recording track.

A track pitch "T/P" corresponds to the sum of a width of the recording track 1a and a width of the non-recording track 1b. When the optical disc 1 is a ROM type, the recording track 1a corresponds to an area with a sequence of pits, and the width of the recording track 1a corresponds to the width of a pit. The non-recording track 1b corresponds to an area located between adjacent sequences of pits in a radial (R) direction of the optical disc 1. When the optical disc 1 is a groove-only type, the recording track 1a corresponds to a groove, and the non-recording track 1b is a land.

When a main push-pull (MPP) signal is detected using a detection signal of the 4-division main photodetector 5 shown in FIG. 2, and a side push-pull (SPP) signal is detected using a detection signal of the first and second 2-division sub photodetector 7a and 7b, a DPP signal can be obtained by Formula (1).

$$DPP\ signal = MPP - k1 \cdot SPP \quad (1)$$

Here, k1 denotes a gain adjustment constant. When a detection signal at each of the light receiving areas A, B, C, and D of the 4-division main photodetector 5, the light receiving areas E and F of the first 2-division sub photodetector 7a, and the light receiving areas G and H of the second 2-division sub photodetector 7b is denoted by the same reference character as the corresponding light receiving area, the main push-pull signal MPP and the side push-pull signal SPP are expressed by Formula (2), as is known widely.

$$MPP = (A+B) - (C+D)$$

$$SPP = (E-F) + (G-H) \quad (2)$$

Conventionally, an optical recording and/or reproducing apparatus compares the DPP signal with an operational signal $R'_X$, which is obtained using a radio frequency (RF) signal $RF'_M$ of the main light beam M and an RF signal $RF'_S$ of the first and second sub light beams S1 and S2, and determines an on-track and a track-crossing direction, i.e., a seek direction.

According to conventional detection methods, the operational signal $R'_X$ is obtained by a signal detection apparatus shown in FIG. 3 using Formula (3).

$$R'_X = RF'_M - k' \cdot RF'_S \quad (3)$$

The RF signal $RF'_M$ of the main light beam M corresponds to the sum of the detections signals at the four light receiving areas A, B, C, and D of the 4-division main photodetector 5 ($RF'_M = A+B+C+D$). The RF signal $RF'_S$ of the first and second sub light beams S1 and S2 corresponds to the sum of the detections signals at the light receiving areas E, F, G, and H of the first and second 2-division sub photodetector 7a and 7b ($RF'_S = E+F+G+H$).

As shown in FIG. 3 and Formula (3), conventionally, the operational signal $R'_X$ is calculated by a subtractor 9 which subtracts the RF signal $RF'_S$ of the sub light beams S1 and S2, whose gain k' has been controlled by a gain adjuster 8, from the RF signal $RF'_M$ of the main light beam M.

When a CD-ROM optical disc having a storage capacity of 650 MB is used, the operational signal $R'_X$ and the DPP signal, which are obtained according to a conventional method, have different phase relations according to a seek direction, i.e., track crossing direction, as shown in FIGS. 4A and 4B. The phase of the operational signal $R'_X$ is different from that of the DPP signal by about ±90° according to the track crossing direction. Accordingly, it is possible to determine an on-track and the track crossing direction with respect to CD-ROM optical discs having a storage capacity of 650 MB using the operational signal $R'_X$ and the DPP signal which are obtained according to conventional methods.

More specifically, a CD-ROM optical disc having a storage capacity of 650 MB has a duty ratio of about 30%. The duty ratio indicates a ratio of the width of the recording track 1a to the width of the non-recording track 1b in a single track pitch T/P.

When the optical disc 1 has a duty ratio of about 30%, there is a phase difference of about 40-60° between a sum signal (A+B) of the detection signals at the two light receiving areas A and B located at one side of the 4-division main photodetector 5 and a sum signal (C+D) of the detection signals at the other two light receiving areas C and D. Similarly, the phase of the detection signal at the light receiving area E and G located at one side of the first and second 2-division sub photodetectors 7a and 7b, respectively, in the R direction is different from that of the detection signal at the light receiving areas F and H located at the other side of the first and second 2-division sub photodetectors 7a and 7b in the R direction.

As described above, because a phase difference exists between the sum signals (A+B) and (C+D) and between the detection signals E and G and the detection signals F and H, addition of these signals and subtraction of these signals give some values. Accordingly, when the optical disc 1 has a duty ratio of about 30%, on-track/off-track and a track crossing direction can be determined using the operational signal $R'_X$ and the DPP signal, which are obtained according to conventional detection methods.

When the duty ratio changes, however, a phase difference between the sum signals (A+B) and (C+D) also changes. In particular, when the optical disc 1 has a duty ratio of about 50% due to reduction of the width of the non-recording track 1b, the phase difference between the sum signals (A+B) and (C+D) would be about 180°. As a result, an appropriate operational signal $R'_X$ cannot be obtained with the conventional detection methods.

FIGS. 5A through 5C are graphs showing changes in a phase difference between the sum signals (A+B) and (C+D) depending on the duty ratio of an optical disc. FIG. 6 is a graph showing changes in the signal $RF'_M$ (=A+B+C+D), i.e., the sum of the sum signals (A+B) and (C+D), according to changes in a duty ratio of an optical disc.

FIGS. 5A through 5C show phase relations between the sum signals (A+B) and (C+D) generated when light is condensed by an objective lens having a numerical aperture of 0.5 and then radiated onto ROM type optical discs having a track pitch of 1.6 μm and different duty ratios. FIG. 6 shows changes in the signal $RF'_M$ according to a change in a duty ratio (pit width) when light is radiated onto ROM type optical discs under the same conditions described in FIGS. 5A through 5C.

Referring to FIG. 5A, when a pit on an optical disc has a width of 0.5 μm, that is, when the optical disc has a duty ratio of about 31%, a phase difference between the sum signals (A+B) and (C+D) is about 70°.

Referring to FIG. 5B, when a pit on an optical disc has a width of 0.6 μm, that is, when the optical disc has a duty ratio of about 38%, a phase difference between the sum signals (A+B) and (C+D) is about 120°.

Referring to FIG. 5C, when a pit on an optical disc has a width of 0.8 μm, that is, when the optical disc has a duty ratio of about 50%, a phase difference between the sum signals (A+B) and (C+D) is about 180°.

As described above, when the duty ratio is about 50%, a phase difference between the sum signal (A+B) and the sum signal (C+D) is about 180°, and therefore, a value of the signal $RF'_M$ obtained by summing the two sum signals (A+B) and (C+D) approximates to zero, as shown in FIG. 6. As a result, it is difficult to properly detect an operational signal used to determine on-track/off-track and/or a track cross direction with the conventional detection methods. In other words, when the duty ratio is 50%, it is impossible to detect an operational signal having sufficient phase and amplitude characteristics to determine on-track/off-track and a track cross direction with the conventional detection methods.

Meanwhile, a phase difference between the sum signals (A+B) and (C+D) changes depending on a track pitch, as shown in FIGS. 7A through 7D. FIGS. 7A through 7D show changes in phase difference between the sum signals (A+B) and (C+D) generated when optical discs have a duty ratio of 30% and different track pitches of 1.1 μm, 1.2 μm, 1.3 μm, and 1.6 μm, respectively. Referring to FIGS. 7A through 7D, a phase difference between the sum signals (A+B) and (C+D) changes from about 130° to about 90°, 80°, and 70° when the track pitch changes from 1.1 μm to 1.2 μm, 1.3 μm, and 1.6 μm. As shown in FIGS. 7A through 7D, the phase difference between the sum signals (A+B) and (C+D) also changes depending on the track pitch. Consequently, the operational signal $R'_X$ detected using conventional methods is influenced by the track pitch of an optical disc.

A light spot formed by radiating light onto an optical disc should have an appropriate size for signal detection, taking into account the track pitch of the optical disc. In other words, for successful signal detection, the light spot needs to have an appropriate size with respect to the track pitch. When considering such a relationship between the track pitch and the light spot, it can be inferred that the operational signal $R'_X$ detected using conventional methods is also influenced by the size of the light spot.

As described above, the operational signal $R'_X$ detected using conventional methods is influenced most by the duty ratio of an optical disc and also is influenced by the track pitch of the optical disc and the light spot size.

However, optical discs have been developed to, for example, have a high duty ratio by decreasing the width of the non-recording tracks 1b to meet demand for higher storage capacity. For example, conventional CDs usually had a storage capacity of 650 MB, but CDs have been developed to have a higher storage capacity by increasing the duty ratio. When the duty ratio of an optical disc is increased by reducing the width of the non-recording tracks 1b, the track pitch T/P decreases. As a result, the storage capacity can be increased.

Because the operational signal $R'_X$ detected using conventional methods is influenced by the duty ratio, the track pitch, and/or the light spot size, an optical recording and/or reproducing apparatus using conventional detection methods may not determine on-track/off-track and/or a track cross direction.

SUMMARY OF THE INVENTION

The present invention provides a signal detection method and apparatus for detecting an operational signal $R'_X$ that rarely changes depending on conditions, such as a duty ratio and a track pitch, of an optical disc and a size of a light spot, and an optical recording and/or reproducing apparatus which determines on-track/off-track and/or a track cross direction using the operational signal $R'_X$ detected using the above-described signal detection method and apparatus.

According to an aspect of the present invention, there is provided a method of detecting a signal, which is used to determine on-track/off-track and/or a track cross direction, using a detection signal corresponding to a main light beam and detection signals respectively corresponding to first and second sub light beams, the main light beam and the first and second sub light beams having been radiated onto an optical information storage medium and reflected from the optical storage medium. When detection signals respectively corresponding to one side portions, in a direction corresponding to a radial direction of the optical information storage medium, of the respective main light beam and first and second sub light beams are referred to as a first main signal, a first sub signal, and a second sub signal, respectively, the method includes obtaining a first operational signal, which is used to determine on-track/off-track and/or a track cross direction, by performing a subtraction on the first and second sub signals and the first main signal.

Additional aspects and/or advantages of the invention will be set forth in part in the description which follows and, in part, will be obvious from the description, or may be learned by practice of the invention.

In an aspect of the present invention, the first operational signal satisfies the following formula:

$$R_X = RF_M - k \cdot RF_S,$$

where "k" represents a gain adjustment constant, $RF_M$ represents the first main signal, and $RF_S$ represents a sum of the first and second sub signals.

According to an aspect of the present invention, when a detection signal corresponding to the other side portion of the main light beam is referred to as a second main signal and detection signals respectively corresponding to the other side portions of the respective first and second sub light beams are referred to as third and fourth sub signals, respectively, the method further includes performing a subtraction on a sum of the first and second main signals and a sum of the first through fourth sub signals to obtain a second operational signal so that the first and second operational signals are selectively used according to a type of the optical information storage medium when on-track/off-track and/or a track cross direction is determined.

In an aspect of the present invention, the second operational signal satisfies the following formula:

$$R'_X = RF'_M - k' \cdot RF'_S,$$

where "k'" represents a gain adjustment constant, $RF'_M$ represents the sum of the first and second main signals, and $RF'_S$ represents the sum of the first through fourth sub signals.

According to another aspect of the present invention, there is provided an apparatus for detecting a signal, which is used to determine on-track/off-track and/or a track cross direction, using a detection signal corresponding to a main light beam and detection signals respectively corresponding to first and second sub light beams, the main light beam and the first and second sub light beams having been radiated onto an optical information storage medium and then reflected therefrom. When detection signals respectively corresponding to one side portions, in a direction corresponding to a radial direction of the optical information storage medium, of the respective main light beam and first and second sub light beams are referred to as a first main signal, a first sub signal, and a second sub signal, respectively, the apparatus includes a first signal operator which performs a subtraction on the first and second sub signals and the first main signal to output a first operational signal used to determine on-track/off-track and/or a track cross direction.

According to an aspect of the present invention, the first signal operator receives the first main signal and the first and second sub signals and outputs the first operational signal satisfying the following formula:

$$R_X = RF_M - k \cdot RF_S,$$

where "k" represents a gain adjustment constant, $RF_M$ represents the first main signal, and $RF_S$ represents a sum of the first and second sub signals.

According to an aspect of the present invention, when a detection signal corresponding to the other side portion of the main light beam is referred to as a second main signal and detection signals respectively corresponding to the other side portions of the respective first and second sub light beams are referred to as third and fourth sub signals, respectively, the apparatus further includes a second signal operator which performs a subtraction on a sum of the first and second main signals and a sum of the first through fourth sub signals to obtain a second operational signal so that the first and second operational signals are selectively used according to a type of the optical information storage medium when on-track/off-track and/or a track cross direction is determined.

According to an aspect of the present invention, the second signal operator receives the first and second main signals and the first through fourth sub signals and outputs the second operational signal satisfying the following formula:

$$R'_X = RF'_M - k' \cdot RF'_S,$$

where "k'" represents a gain adjustment constant, $RF'_M$ represents the sum of the first and second main signals, and $RF'_S$ represents the sum of the first through fourths sub signals.

According to an aspect of the present invention, each of the main light beam and the first and second sub light beams is divided and received so that a differential push-pull signal can be detected, the apparatus further comprising a differential push-pull signal operator which detects the differential push-pull signal.

According to still another aspect of the present invention, there is provided an optical recording and/or reproducing apparatus including an optical pickup and a signal detection apparatus. The optical pickup radiates a main light beam and first and second sub light beams on an optical information storage medium and detects at least one side portions, in a direction corresponding to a radial direction of the optical information storage medium, of the respective main light beam and the first and second light beams that have been reflected from the optical information storage medium. When detection signals respectively corresponding to the one side portions of the respective main light beam and the first and second light beams that have been reflected from the optical information storage medium are referred to as a first main signal, a first sub signal, and a second sub signal, respectively, the signal detection apparatus includes a first signal operator performing a subtraction on the first main signal and the first and second sub signals to output a first operational signal that is used to determine on-track/off-track and/or a track cross direction.

According to an aspect of the present invention, the optical pickup includes a 4-division main photodetector which divides and detects the main light beams in four divisions, a first 2-division sub photodetector which divides and detects the first sub light beam in two divisions, and a second 2-division sub photodetector which divides and detects the second sub light beam in two divisions, so that a differential push-pull signal can be detected.

BRIEF DESCRIPTION OF THE DRAWINGS

These and/or other aspects and advantages of the invention will become apparent and more readily appreciated from the following description of the embodiments taken in conjunction with the accompanying drawings in which:

FIG. 2 is a schematic diagram of a structure of a photodetector which divides and receives the main light beam and the first and second sub light beams that have been radiated onto the optical disc, as shown in FIG. 1, and then reflected therefrom;

DETAILED DESCRIPTION OF THE EMBODIMENTS

Figure 1:
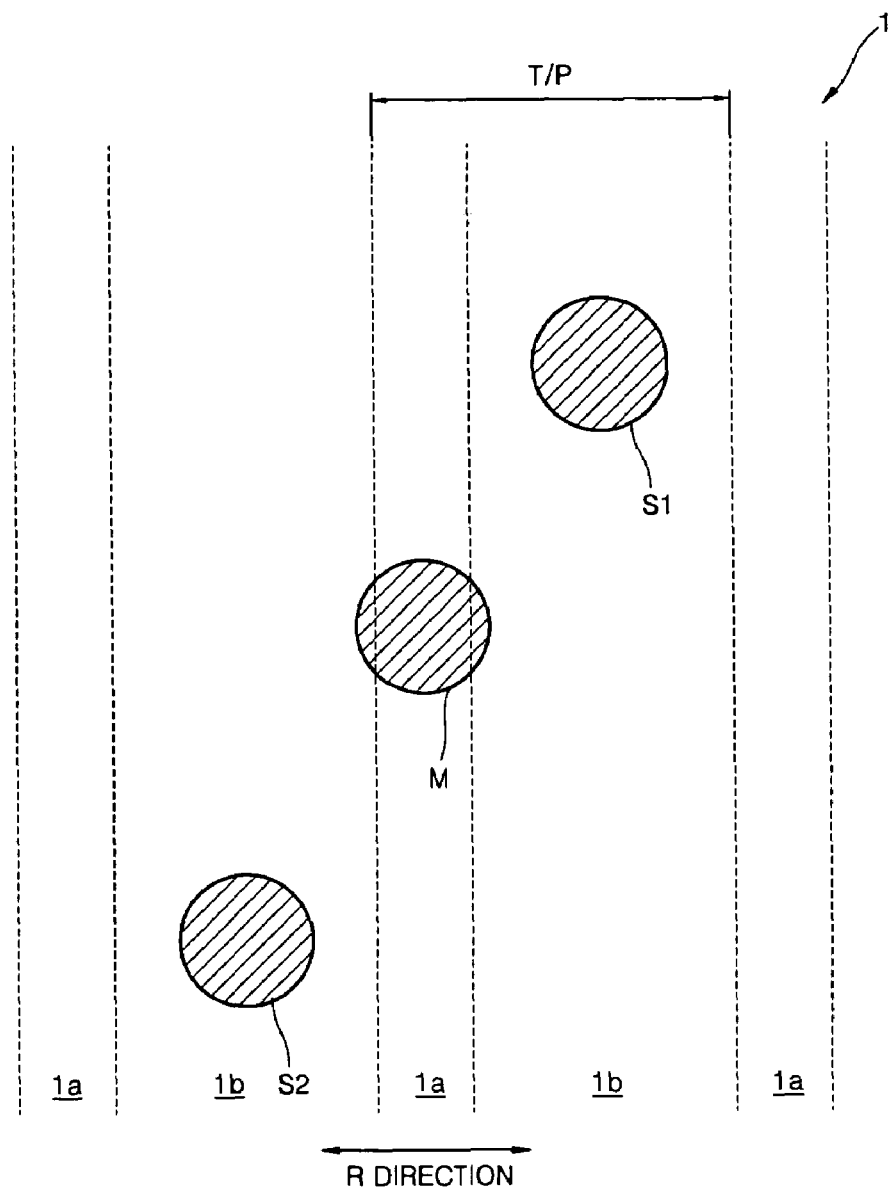
FIG. 1 illustrates a main light beam and first and second sub light beams which are radiated onto an optical disc by an optical pickup included in an optical recording and/or reproducing apparatus for detecting a tracking error signal using a differential push-pull (DPP) method.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 8:
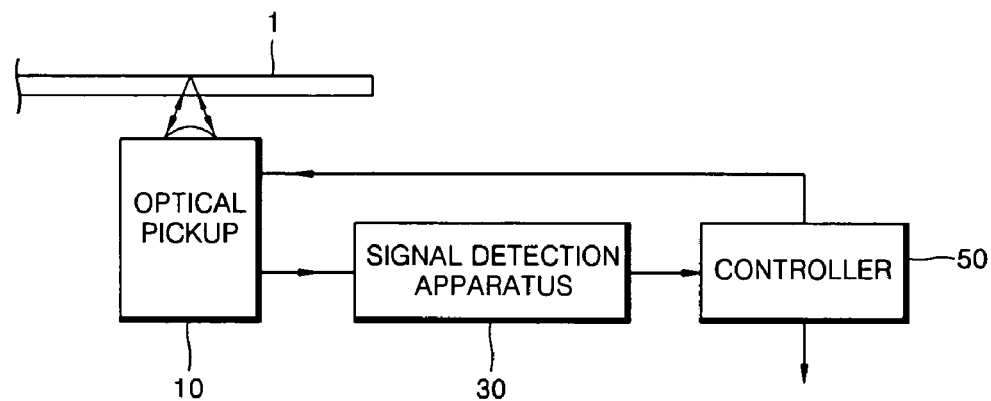
FIG. 8 is a schematic diagram of a structure of an optical recording and/or reproducing apparatus including a signal detection apparatus, according to an embodiment of the present invention.

FIG. 8 is a schematic diagram of a structure of an optical recording and/or reproducing apparatus including a signal detection apparatus. Referring to FIG. 8, the optical recording and/or reproducing apparatus includes an optical pickup 10, a signal detection apparatus 30 that detects a signal used to determine on-track/off-track and/or a track cross direction, and a controller 50 that determines on-track/off-track and/or the track cross direction based on the signal detected by the signal detection apparatus 30 and controls the optical pickup 10.

In the optical recording and/or reproducing apparatus of FIG. 8, the optical pickup 10 radiates the main light beam M and the first and second sub light beams S1 and S2 onto the optical disc 1 and detects at least one side portion of each of the main light beam M and the first and second sub light beams S1 and S2, which are reflected from the optical disc 1, in a direction corresponding to a radial direction of the optical disc 1. The direction corresponding to a radial direction of the optical disc 1 is hereinafter referred to as an R direction.

For example, the optical pickup 10 may have an optical structure for detecting a tracking error signal (hereinafter, referred to as a differential push-pull (DPP) signal) using a DPP method. The optical pickup 10 having such an optical structure splits a light beam emitted from a light source into the main light beam M and the first and second sub-light beams S1 and S2 using a grating and radiates them onto the optical disc 1 to alternate with one another in a radial direction and a tangential direction of the optical disc, as illustrated in FIG. 1. Also, the optical pickup 10 divides and receives the main light beam M and the first and second sub light beams S1 and S2, which have been reflected from the optical disc 1.

As shown in FIG. 2, the optical pickup 10 may include a photodetector including the 4-division main photodetector 5 which divides and receives the main light beam M and the first and second 2-division sub photodetectors 7a and 7b which divide and receive the first and second sub light beams S1 and S2, respectively.

An optical pickup having such an optical structure for radiating three light beams on an optical disc and dividing and receiving each of the three light beams reflected from the optical disc using a plurality of photodetectors is widely known in the field of the invention.

The signal detection apparatus 30 is designed to detect an operational signal $R_X$, which is used to determine on/track or off/track and/or a track cross direction, using some of detection signals obtained from the main light beam M and some of detection signals obtained from the first and second sub light beams S1 and S2 so that the operational signal $R_X$ is rarely influenced by the duty ratio and the track pitch of the optical disc 1.

Figure 9:
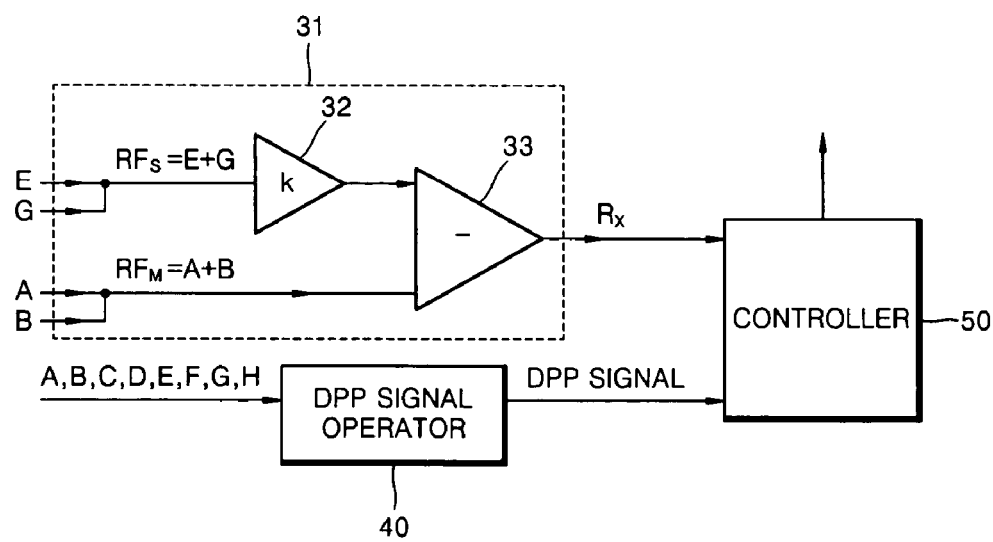
FIG. 9 is a schematic block diagram of a structure of a signal detection apparatus according to an embodiment of the present invention.
Figure 11:
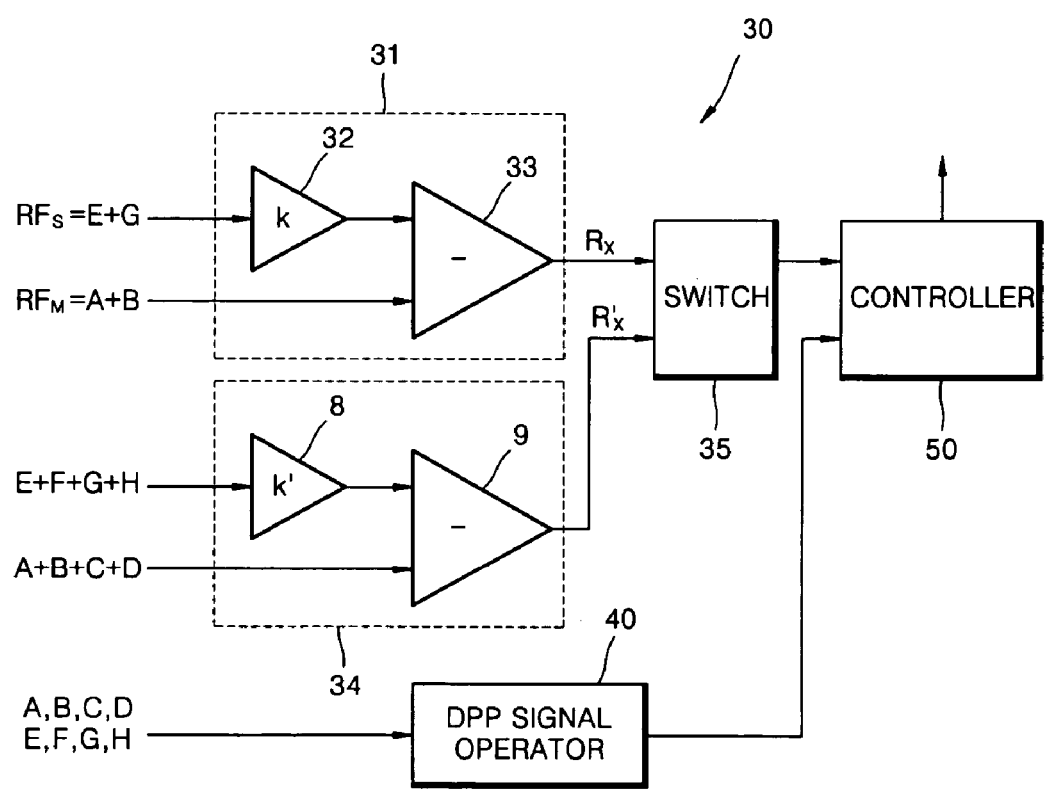
FIG. 11 is a schematic block diagram of a structure of a signal detection apparatus according to an embodiment of the present invention.

As shown in FIG. 9, the signal detection apparatus 30 may include a first signal operator 31 that performs an operation on a detection signal obtained from a part of the main light beam M and a detection signal obtained from a part of each of the first and second sub light beams S1 and S2 to generate the operational signal $R_X$ which is rarely influenced by the duty ratio or the track pitch of the optical disc 1. Alternatively, as shown in FIG. 11, the signal detection apparatus 30 may include first and second signal operators 31 and 34 to detect the operational signal $R_X$ according to the present invention and the operational signal $R'_X$ according to a conventional detection method so that the operational signal $R_X$ according to a detection method of the present invention and the operational signal $R'_X$ according to the conventional detection method can be selectively used in accordance with a type of optical disc.

FIG. 9 is a schematic block diagram of a structure of a signal detection apparatus. The signal detection apparatus in this embodiment receives the detection signal obtained from a part of the main light beam M radiated onto and then reflected from the optical disc 1 of FIG. 1 and the detection signal obtained from a part of the first and second sub light beams S1 and S2 radiated onto and then reflected from the optical disc 1 and performs an operation on the detection signals to output the operational signal $R_X$. In FIG. 9, reference characters A through H denote detection signals output from the respective light receiving areas included in the 4-division main photodetector 5 and the first and second 2-division sub photodetectors 7a and 7b.

Referring to FIG. 9, the signal detection apparatus includes the first signal operator 31 which performs a subtraction on a first main signal $RF_M$ and first and second sub signals to output the operational signal $R_X$.

For example, the first signal operator 31 includes a subtractor 33 which receives the first main signal $RF_M$ and a sum signal $RF_S$ of the first and second sub signals and performs a subtraction on them. The first main signal $RF_M$ corresponds to one side portion of the main light beam M, which has been reflected from the optical disc 1 and received, in the R direction. Each of the first and second sub signals corresponds to one side portion of each of the first and second sub light beams, which has been reflected from the optical disc 1 and received, in the R direction.

When the optical pickup 10 includes the 4-division main photodetector 5 and the first and second 2-division sub photodetectors 7a and 7b, as shown in FIG. 2, the first main signal $RF_M$ corresponds to a sum signal (A+B) of detection signals obtained from the light receiving areas A and B located at one side of the 4-division main photodetector 5 in the R direction. The first sub signal corresponds to a detection signal obtained from the light receiving area E located at one side of the first 2-division sub photodetector 7a in the R direction. The second sub signal corresponds to a detection signal obtained from the light receiving area G located at one side of the second 2-division sub photodetector 7b in the R direction.

In the signal detection apparatus the first signal operator 31 further includes a gain adjuster 32, which adjusts a gain of the sum signal $RF_S$ of the first and second sub signals. Alternatively, a gain adjuster may be installed to adjust the gains of the respective first and second sub signals. Alternatively, a gain adjuster may be installed to adjust the gain of the first main signal $RF_M$ and the gains of the respective first and second sub signals or the gain of the sum signal $RF_S$ of the first and second sub signals.

As shown in FIG. 9, when the first signal operator 31 includes the gain adjuster 32 and the subtractor 33 such that a subtraction is performed on the first main signal $RF_M$ and the sum signal $RF_S$ of the first and second sub signals after gain control is performed, the operational signal $R_X$ corresponds to the result of subtracting the gain adjusted sum signal $RF_S$ from the first main signal $RF_M$ and is expressed by Formula (4).

$$R_X = RF_M - k \cdot RF_S \quad (4)$$

Here, "k" is a gain adjustment constant.

The signal detection apparatus may further include a DPP signal operator 40, which performs an operation on a DPP signal. The DPP signal operator 40 may be provided separately from the signal detection apparatus 30, or the DPP may be included as part of the signal detection apparatus 30.

Figure 10:
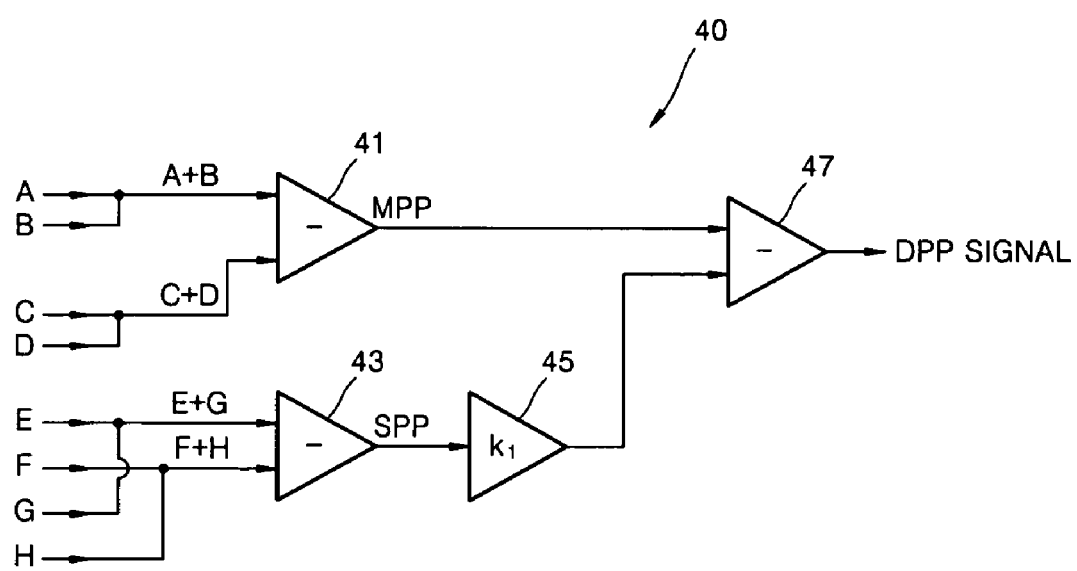
FIG. 10 is a schematic block diagram showing an example of a structure of a DPP signal operator which outputs a DPP signal after being subjected to an operation.

Referring to FIG. 10, the DPP signal operator 40 includes a first subtractor 41 which outputs a main push-pull (MPP) signal, a second subtractor 43 which outputs a side push-pull (SPP) signal, a gain adjuster 45 which adjusts a gain k1 of the SPP signal, and a third subtractor 47 which performs a subtraction on the MPP signal and the SPP signal whose gain k1 has been adjusted to output the DPP signal.

The first subtractor 41 receives the sum signal (A+B) of the detection signals respectively obtained from the light receiving areas A and B located at one side of the 4-division main photodetector 5 in the R direction and the sum signal (C+D) of the detection signals respectively obtained from the other light receiving areas C and D of the 4-division main photodetector 5 through two input terminals, respectively. The first subtractor 41 performs a subtraction on the received sum signals (A+B) and (C+D) to output the main push-pull signal MPP.

In other words, when a received signal corresponding to the other side portion of the main light beam M in the R direction, i.e., a received signal corresponding to the other portion of the main light beam M, is referred to as a second main signal, the first subtractor 41 receives the first and second main signals through the two input terminals, respectively, and performs a subtraction on them, thereby outputting the MPP signal.

The second subtractor 43 receives the sum signal (E+G) of the detection signals obtained from the light receiving areas E and G respectively located at one side of the first and second 2-division photodetector 7a and 7b in the R direction and the sum signal (F+H) of the detection signals obtained from the other light receiving areas F and H of the first and second 2-division photodetector 7a and 7b through two input terminals, respectively. The second subtractor 43 performs a subtraction on the received sum signals (E+G) and (F+H) to output the SPP signal.

In other words, when received signals respectively corresponding to the other side portions of the respective first and second sub light beams S1 and S2 in the R direction, i.e., signals respectively corresponding to the other portions of the respective first and second sub light beams S1 and S2, are referred to as third and fourth sub signals, respectively, the second subtractor 43 receives a sum signal of the first and third sub signals and a sum signal of the second and fourth sub signals through the two input terminals, respectively, and performs a subtraction on the received sum signals, thereby outputting the SPP signal.

Alternatively, the DPP signal operator 40 may have a circuit structure that performs a subtraction on the detection signals respectively obtained from the light receiving areas E and F of the first 2-division photodetector 7a, performs a subtraction on the detection signals respectively obtained from the light receiving areas G and H of the second 2-division photodetector 7b, and then performs an addition on difference signals (E-F) and (G-H) to output the SPP signal.

The gain adjuster 45 adjusts the gain k1 of the SPP signal. The third subtractor 47 performs subtraction on the MPP signal and the SPP signal whose gain k1 has been adjusted and outputs the DPP signal, as expressed by Formula (2).

Figure 3:
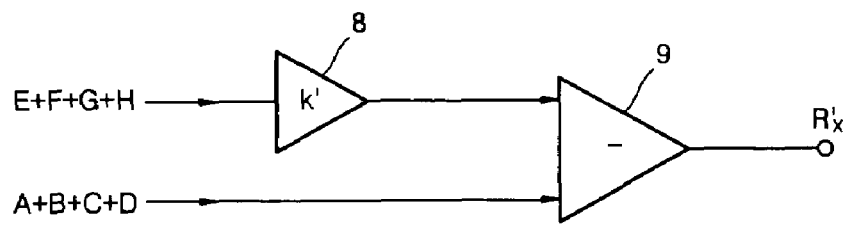
FIG. 3 is a schematic block diagram of a conventional signal detection apparatus for detecting an operational signal using a conventional signal detection method.
Figure 4A:
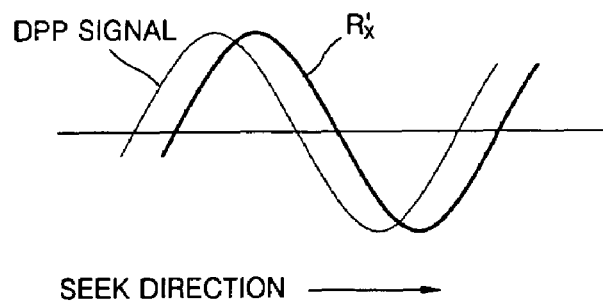
FIGS. 4A and 4B are graphs showing phase relations between an operational signal detected using conventional methods and a DPP signal according to track cross directions on a CD-ROM type optical disc with a storage capacity of 650 MB.
Figure 4B:
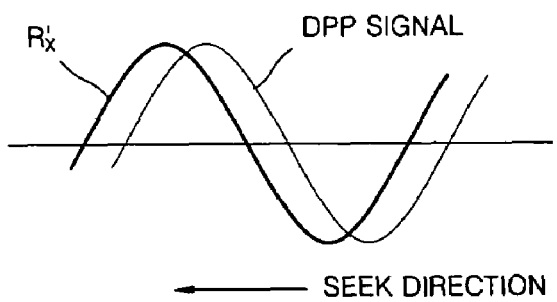
Figure 5A:
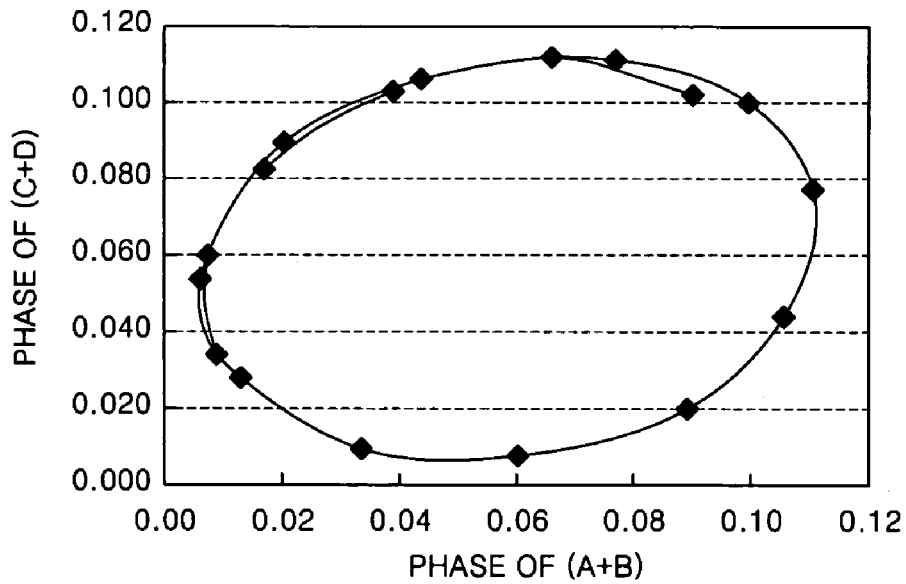
FIGS. 5A through 5C are graphs illustrating phase differences between two sum signals changing depending on a duty ratio of an optical disc.
Figure 5B:
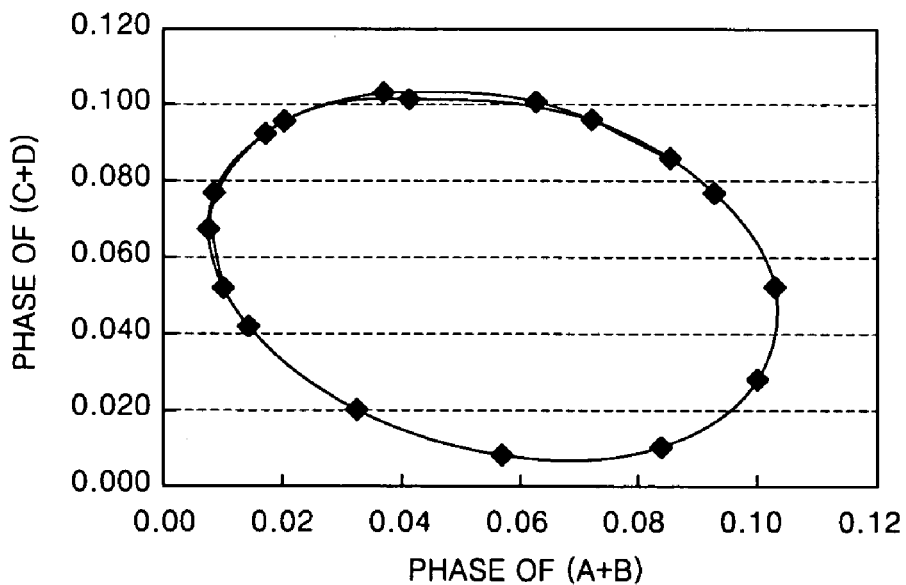
Figure 5C:
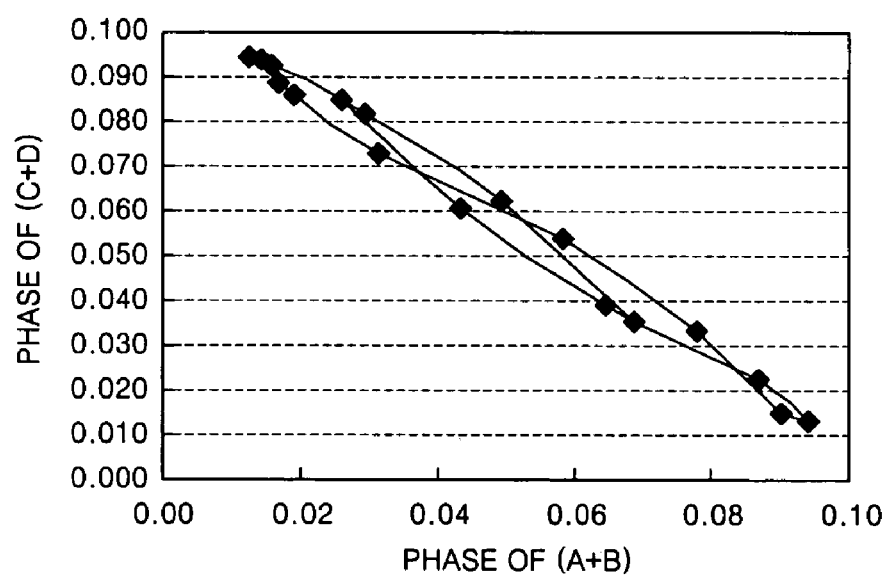
Figure 6:
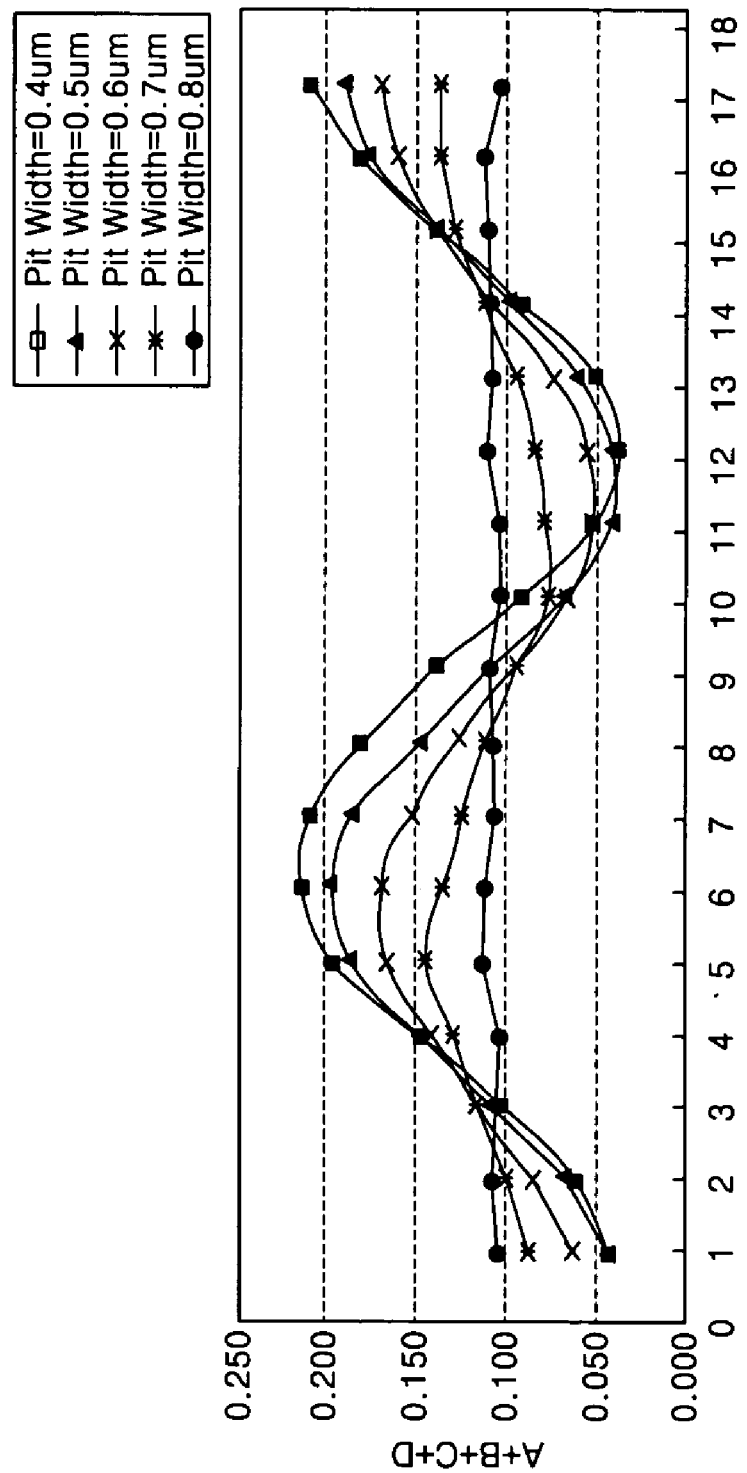
FIG. 6 is a graph showing a signal corresponding to the sum of the two sum signals changing depending on a duty ratio of an optical disc.
Figure 7A:
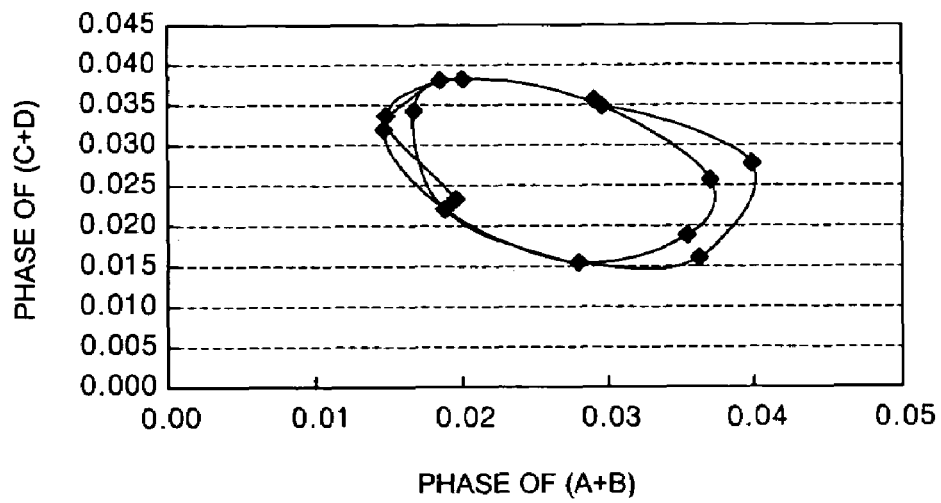
FIGS. 7A through 7D are graphs showing changes in phase of two sum signals when optical discs have a duty ratio of 30% and different track pitches of 1.1 µm, 1.2 µm, 1.3 µm, and 1.6 µm, respectively.
Figure 7B:
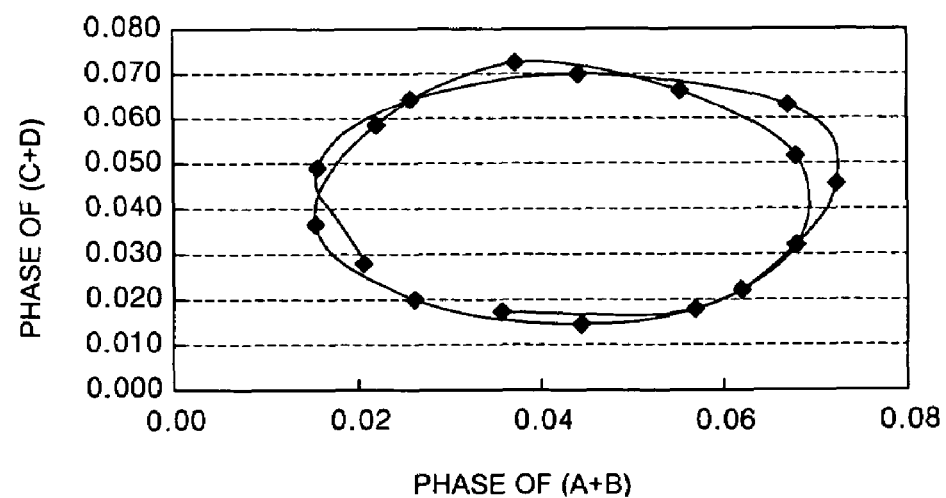
Figure 7C:
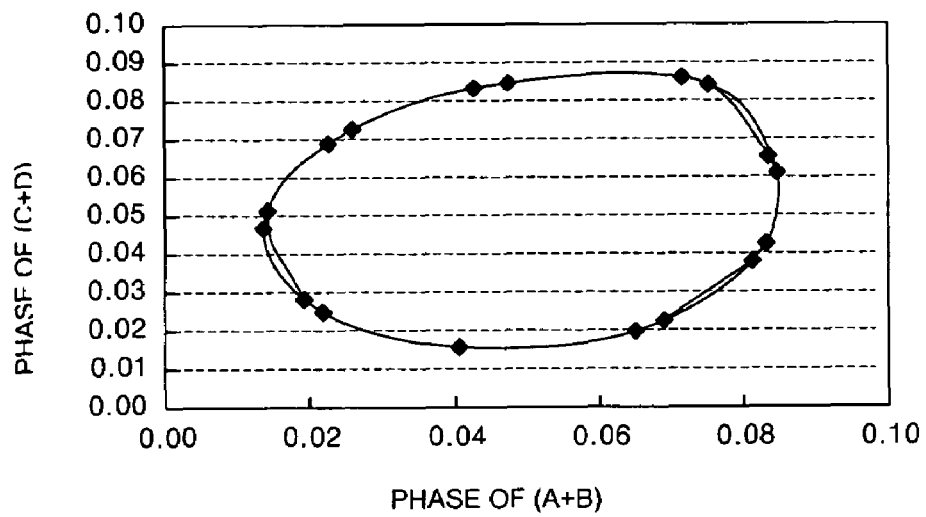
Figure 7D:
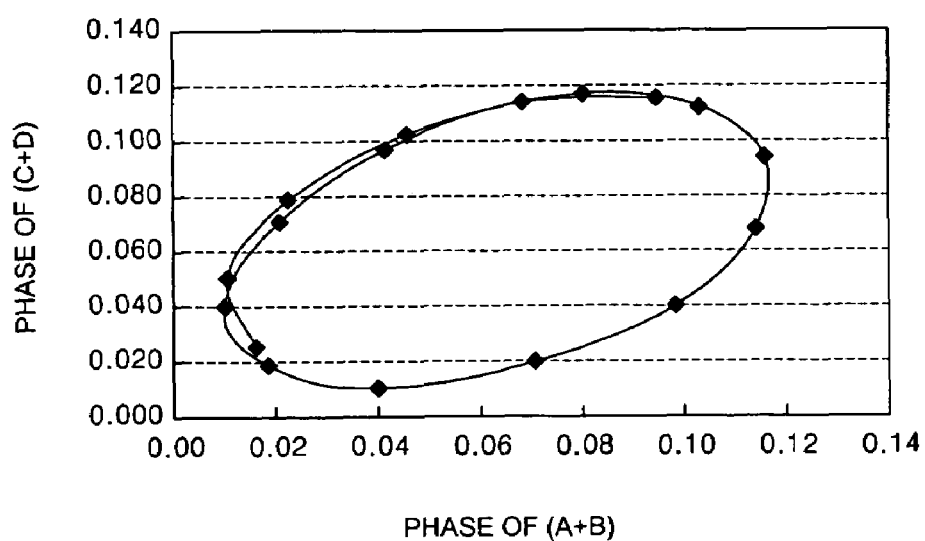

FIG. 11 is a schematic block diagram of a structure of a signal detection apparatus according to an alternative embodiment of the present invention. This embodiment includes the second signal operator 34, which detects the operational signal $R'_X$ according to a conventional detection method as shown in FIG. 3, to allow an optical recording and/or reproducing apparatus to determine on-track/off-track and/or a track cross direction so that the operational signals $R_X$ and $R'_X$ can be selectively used according to a type of optical disc.

Referring to FIG. 11, to output the operational signal $R'_X$ satisfying Formula (3) in accordance with conventional detection methods, the second signal operator 34 may include the subtractor 9 and the gain adjuster 8. As shown in FIG. 3 and Formula (3), the operational signal $R'_X$ can be obtained by subtracting the RF signal ($RF'_X = E+F+G+H$), the gain k' of which has been adjusted, with respect to the first and second sub light beams S1 and S2 from the RF signal ($RF'_M = A+B+C+D$) with respect to the main light beam M. The RF signal ($RF'_M = A+B+C+D$) corresponds to the sum of the first and second main signals, and the RF signal ($RF'_S = E+F+G+H$) corresponds to the sum of the first through fourth sub signals.

In FIG. 11, the gain adjuster 8 may be disposed to adjust the gain k' of the RF signal ($RF_S = E+F+G+H$). In another example, however, one or more gain adjusters 8 may be provided such that gains of the respective first and second main signals are adjusted, a gain of the sum signal of the first and second main signals is adjusted, gains of the respective first through fourth sub signals are adjusted, or a gain of the sum signals of the first through fourth sub signals is adjusted.

When the signal detection apparatus according to the present invention further includes the second signal operator 34 that generates the operational signal $R'_X$ according to a conventional detection method, as shown in FIG. 11, an optical recording and/or reproducing apparatus according to the present invention can selectively use the operational signals $R_X$ and $R'_X$ according to a type of optical disc when determining on-track/off-track and/or a track cross direction.

For example, when an optical disc has a duty ratio of about 50%, the operational signal $R_X$ obtained using a detection method of the present invention can be used to determine on-track/off-track and/or a track cross direction, and when an optical disc has a duty ratio of about 30%, the operational signal $R'_X$ obtained using a conventional detection method can be used to determine on-track/off-track and/or a track cross direction.

When the signal detection apparatus according to an embodiment of the present invention further includes the second signal operator 34 to generate the operational signal $R'_X$ in accordance with a conventional detection method, a switch 35 is included to selectively output the operational signals $R_X$ and $R'_X$, as shown in FIG. 11.

When the signal detection apparatus shown in FIG. 11 is used, the controller 50 controls the switch 35 according to a duty ratio or a track pitch of an optical disc loaded in an optical recording and/or reproducing apparatus such that one of the operational signals $R_X$ and $R'_X$ is input to the controller 50. The controller 50 determines on-track/off-track and/or a track cross direction using the selected operational signal $R_X$ or $R'_X$.

Alternatively, without using the switch 35, the controller 50 may be designed to receive both of the operational signals $R_X$ and $R'_X$, select one of them according to a type of optical disc, and determine on-track/off-track and/or a track cross direction using the selected operational signal $R_X$ or $R'_X$.

As described above, according to an embodiment of the present invention, the operational signal $R_X$, which is generated using a detection signal corresponding to a part of the main light beam M and a detection signal corresponding to a part of each of the first and second sub light beams S1 and S2, is rarely influenced by the duty ratio and the track pitch of an optical disc and a size of a light spot on the optical disc. Therefore, the present invention can be effectively used with high storage capacity optical discs.

Figure 12:
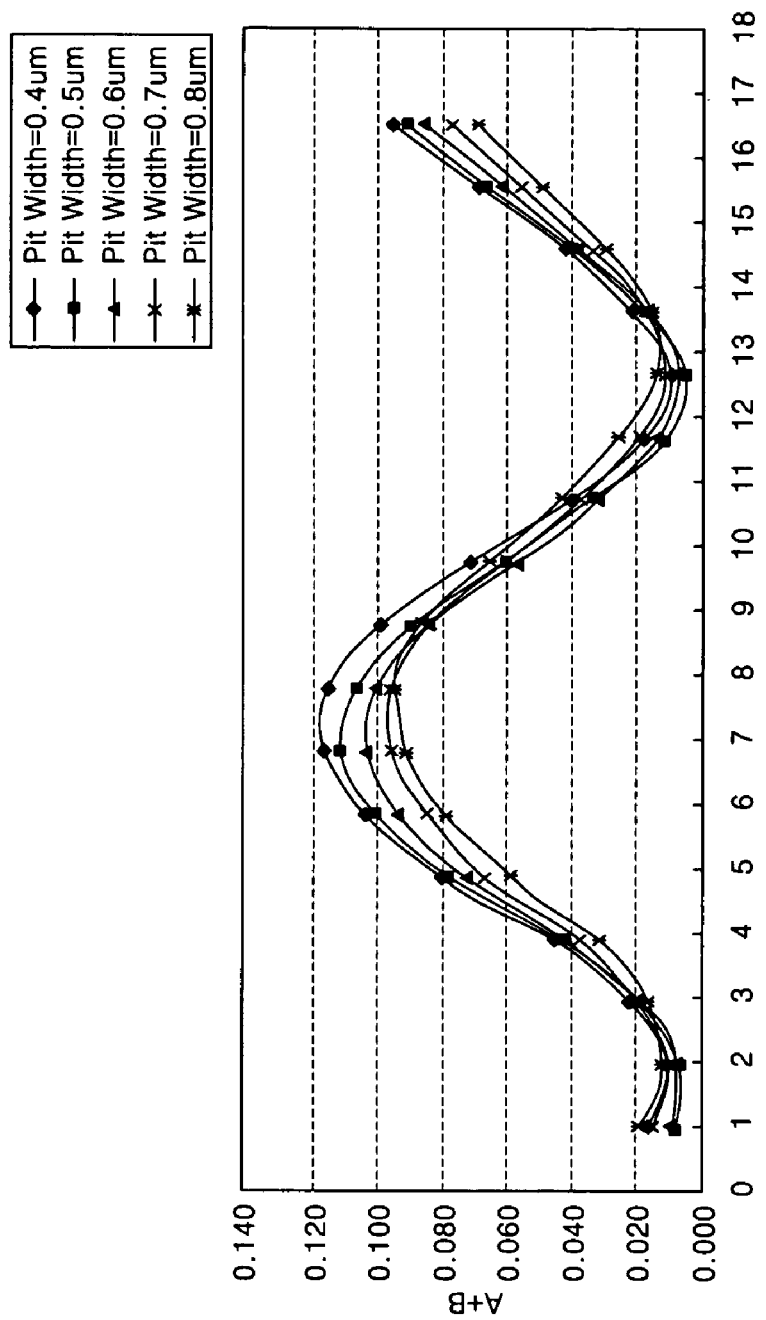
FIG. 12 is a graph showing changes in a first main signal when a duty ratio of an optical disc changes.

FIG. 12 is a graph showing changes in the first main signal ($RF_M$=A+B) according to the variation of a duty ratio. FIG. 12 shows the variation of first main signals ($RF_M$=A+B) with respect to the variation of a duty ratio (i.e., a width of a pit) when light is condensed by an objective lens having a numerical aperture of 0.5 and then radiated onto ROM type optical discs having a track pitch of 1.6 μm and different duty ratios, as like FIGS. 5A through 5C and FIG. 6.

As shown in FIG. 12, even if the duty ratio changes, phase of the first main signal ($RF_M$=A+B) has minor changes. Conventionally, when the duty ratio is about 50%, a phase difference between the sum signal (A+B) and the sum signal (C+D) is about 180°, which causes a problem in that a value of the signal $RF'_M$ obtained by adding the two sum signals (A+B) and (C+D) approximates to zero. However, the present invention overcomes this problem. Therefore, in the present invention, even if the duty ratio is about 50%, an operational signal having proper phase and amplitude characteristics to determine on-track/off-track and/or a track cross direction can be detected.

A signal detection apparatus according to the present invention is especially advantageous when it is used for an optical recording and/or reproducing apparatus using the DPP signal. For example, a signal detection apparatus according to the present invention can be effectively used for an optical recording and/or reproducing apparatus used to record and/or reproduce data to/from an optical disc of the CD family and data from an optical disc of the DVD family.

In addition to an optical recording and/or reproducing apparatus using the DPP signal, a signal detection apparatus according to the present invention can be used for various types of optical recording and/or reproducing apparatus to enable the optical recording and/or reproducing apparatus to accurately determine on-track/off-track and/or a track cross direction using the proper operational signal $R_X$.

As described above, according to the present invention, the operational signal $R_X$, which is generated using a detection signal corresponding to a part of a main light beam and a detection signal corresponding to a part of a sub light beam, is rarely influenced by the duty ratio and the track pitch of an optical disc and a light spot size on the optical disc. Accordingly, the present invention allows on-track/off-track and/or a track cross direction to be accurately determined regardless of conditions of an optical disc, such as the duty ratio and the track pitch. Consequently, the present invention can be effectively used with high storage capacity optical discs.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of detecting on-track/off-track and/or a track cross direction, consisting of:
using a detection signal corresponding to a main light beam and detection signals respectively corresponding to first and second sub light beams, the main light beam and the first and second sub light beams having been radiated onto an optical information storage medium and reflected therefrom, when detection signals respectively corresponding to one side portions, in a direction corresponding to a radial direction of the optical information storage medium, of the respective main light beam and first and second sub light beams are referred to as a first main signal, a first sub signal, and a second sub signal, respectively;
obtaining a first operational signal, which is used to determine on-track/off-track and/or a track cross direction, by performing a subtraction on a sum signal of the first and second sub signals and the first main signal.

2. The method of claim 1, wherein the first operational signal satisfies the following formula:

$$R_X = RF_M - k \cdot RF_S,$$

where "k" represents a gain adjustment constant, $RF_M$ represents the first main signal, and $RF_S$ represents a sum of the first and second sub signals.

3. The method of claim 2, wherein a detection signal corresponding to another side portion of the main light beam is referred to as a second main signal and detection signals respectively corresponding to another side portions of the respective first and second sub light beams are referred to as third and fourth sub signals, respectively, the method further comprising performing a subtraction on a sum of the first and second main signals and a sum of the first through fourth sub signals to obtain a second operational signal so that the first and second operational signals are selected according to a type of the optical information storage medium when on-track/off-track and/or a track cross direction is determined.

4. The method of claim 3, wherein the second operational signal satisfies the following formula:

$$R'_X = RF'_M - k' \cdot RF'_S,$$

where "k'" represents a gain adjustment constant, $RF'_M$ represents the sum of the first and second main signals, and $RF'_S$ represents the sum of the first through fourth sub signals.

5. The method of claim 1, wherein a detection signal corresponding to another side portion of the main light beam is referred to as a second main signal and detection signals respectively corresponding to another side portions of the respective first and second sub light beams are referred to as third and fourth sub signals, respectively, the method further comprising performing a subtraction on a sum of the first and second main signals and a sum of the first through fourth sub signals to obtain a second operational signal so that the first and second operational signals are selectively used according to a type of the optical information storage medium when on-track/off-track and/or a track cross direction is determined.

6. The method of claim 5, wherein the second operational signal satisfies the following formula:

$$R'_X = RF'_M - k' \cdot RF'_S,$$

where "k'" represents a gain adjustment constant, $RF'_M$ represents the sum of the first and second main signals, and $RF'_S$ represents the sum of the first through fourth sub signals.

7. An apparatus for detecting a signal, which is used to determine on-track/off-track and/or a track cross direction, using a detection signal corresponding to a main light beam and detection signals respectively corresponding to first and second sub light beams, the main light beam and the first and second sub light beams having been radiated onto an optical information storage medium and the reflected therefrom, wherein detection signals respectively corresponding to one side portions, in a direction corresponding to a radial direction of the optical information storage medium, of the respective main light beam and first and second sub light beams are referred to as a first main signal, a first sub signal, and a second sub signal, respectively, the apparatus comprising:

a first signal operator consisting of circuitry for performing a subtraction on the combination of the first and second sub signals, and the first main signal to output a first operational signal used to determine on-track/off-track and/or a track cross direction.

8. The apparatus of claim 7, wherein the first signal operator receives the first main signal and the first and second sub signals and outputs the first operational signal satisfying the following formula:

$$R_X = RF_M - k \cdot RF'_S,$$

where "k" represents a gain adjustment constant, $RF_M$ represents the first main signal, and $RF_S$ represents a sum of the first and second sub signals.

9. The apparatus of claim 7, wherein a detection signal corresponding to another side portion of the main light beam is referred to as a second main signal and detection signals respectively corresponding to another side portion of the respective first and second sub light beams are referred to as third and fourth sub signals, respectively, the apparatus further comprising a second signal operator which performs a subtraction on a sum of the first and second main signals and a sum of the first through fourth sub signals to obtain a second operational signal so that the first and second operational signals are selectively used according to a type of the optical information storage medium when on-track/off-track and/or a track cross direction is determined.

10. The apparatus of claim 9, wherein the second signal operator receives the first and second main signals and the first through fourth sub signals and outputs the second operational signal satisfying the following formula:

$$R'_X = RF'_M - k' \cdot RF'_S,$$

where "k'" represents a gain adjustment constant, $RF'_M$ represents the sum of the first and second main signals, and $RF'_S$ represents the sum of the first through fourths sub signals.

11. The apparatus of claim 7, wherein each of the main light beam and the first and second sub light beams is divided and received so that a differential push-pull signal is detected, the apparatus further comprising a differential push-pull signal operator which detects the differential push-pull signal.

12. An optical recording and/or reproducing apparatus comprising:

an optical pickup which radiates a main light beam and first and second sub light beams on an optical information storage medium and detects at least one side portion, in a direction corresponding to a radial direction of the optical information storage medium, of the respective main light beam and the first and second light beams that have been reflected from the optical information storage medium; and wherein detection signals respectively corresponding to the at least one side portion of the respective main light beam and the first and second light beams that have been reflected from the optical information storage medium are referred to as a first main signal, a first sub signal, and a second sub signal, respectively; and a signal detection apparatus including a first signal operator which consists of circuitry for performing a subtraction on the first main signal and a sum signal of the first and second sub signals to output a first operational signal to determine on-track/off-track and/or a track cross direction.

13. The optical recording and/or reproducing apparatus of claim 12, wherein the first signal operator receives the first main signal and the first and second sub signals and outputs the first operational signal satisfying the following formula:

$$R_X = RF_M - k \cdot RF_S,$$

where "k" represents a gain adjustment constant, $RF_M$ represents the first main signal, and $RF_S$ represents a sum of the first and second sub signals.

14. The optical recording and/or reproducing apparatus of claim 12, wherein when a detection signal corresponding to another side portion of the main light beam is referred to as a second main signal and detection signals respectively corresponding to another side portions of the respective first and second sub light beams are referred to as third and fourth sub signals, respectively, the signal detection apparatus further comprises a second signal operator which performs a subtraction on a sum of the first and second main signals and a sum of the first through fourth sub signals to obtain a second operational signal so that the first and second operational signals are selectively used according to a type of the optical information storage medium when on-track/off-track and/or a track cross direction is determined.

15. The optical recording and/or reproducing apparatus of claim 14, wherein the second signal operator receives the first and second main signals and the first through fourth sub signals and outputs the second operational signal satisfying the following formula:

$$R'_X = RF'_M - k' \cdot RF'_S,$$

where "k'" represents a gain adjustment constant, $RF'_M$ represents the sum of the first and second main signals, and $RF'_S$ represents the sum of the first through fourth sub signals.

16. The optical recording and/or reproducing apparatus of claim 12, wherein the optical pickup comprises:
   a 4-division main photodetector which divides and detects the main light beam in four divisions;
   a first 2-division sub photodetector which divides and detects the first sub light beam in two divisions; and
   a second 2-division sub photodetector which divides and detects the second sub light beam in two divisions, so that a differential push-pull signal is detectable.

17. The optical recording and/or reproducing apparatus of claim 16, wherein the signal detection apparatus further comprises a differential push-pull signal operator which detects the differential push-pull signal.

18. A track detector comprising:
   a light emitter to apply a main light beam and a first and second sub light beam to a surface of an optical disc;
   a light detector having a main photodetector having four equal photodection surfaces, and a first sub photodetector and a second sub photodetector having at least two photodetection surfaces, split orthogonally to the radial direction of the optical disc, wherein the main photodetector and the first and second photodetector generate electrical signals at each photodetection surface corresponding to the main light beam and the first and second sub light beams reflected from the surface of the optical disc respectively;
   a track signal detection circuit producing a primary operational signal based on only a difference between a first signal corresponding to a sum of two of the photodetection surfaces of the main photodetector located on the same half of the main photodetector radially and a second signal corresponding to a sum of one of the photodetection surfaces of the first sub photodetector and one of the photodetection surfaces of the second sub phototdetector; and
   a controller identifying tracks and determining tracks that are crossed based on the primary operational signal from the track signal detection circuit.

19. The detector of claim 18, wherein a predetermined gain amplifier adjusts the second signal before the difference is calculated.

20. The detector of claim 18, further comprising a differential push pull signal operator, wherein a differential push pull signal is generated based on the signals of the photodetection surfaces of the main photodetector, the fist sub photodetector and the second sub photodetector, and the differential push pull signal is output to the controller for tracking.

21. The detector of claim 20, further comprising a secondary track detector circuit to produce a secondary operational signal based on the main photodetector, the first sub photodetector and the second sub photodetector, wherein the secondary operational signal is output to the controller and the controller selectively identifies tracks and track crossings based on one of the primary operational signal and the secondary operational signal corresponding to a type of the optical disc.

22. The detector of claim 21, wherein when the type of the optical disc corresponds to a disc having a duty ratio of approximately 50%, the primary operational signal is selected by the controller, and when the type of the optical disc corresponds to a disc having a duty ratio of approximately 30%, the secondary operational signal is selected by the controller.

23. The detector of claim 20, further comprising a secondary track circuit comprising:
   a secondary track signal detection circuit producing a secondary operational signal based on a difference between a first signal corresponding to a sum of the electrical signals of the four photodetection surfaces of the main photodetector and a second signal corresponding to a sum of the electrical signals of the photodetection surfaces of the first sub photodetector and the second sub phototdetector; and
   a switch, wherein the switch selectively outputs the primary operational signal and the secondary operational signal to the controller based on a type of the optical disc.

24. The detector of claim 23, wherein when the type of the optical disc corresponds to a disc having a duty ratio of approximately 50%, the primary operational signal is output by the switch, and when the type of the optical disc corresponds to a disc having a duty ratio of approximately 30%, the secondary operational signal is output by the switch.

* * * * *

UNITED STATES PATENT AND TRADEMARK OFFICE
CERTIFICATE OF CORRECTION

PATENT NO. : 7,420,895 B2 Page 1 of 1
APPLICATION NO. : 10/746147
DATED : September 2, 2008
INVENTOR(S) : Eun-Goo Kim et al.

It is certified that error appears in the above-identified patent and that said Letters Patent is hereby corrected as shown below:

Column 15, Line 22, change "photodection" to --photodetection--.

Column 15, Lines 38-39, change "phototdetector;" to --photodetector;--.

Column 16, Line 4, change "fist" to --first--.

Column 16, Line 32, change "phototdetector;" to --photodetector;--.

Signed and Sealed this

Sixteenth Day of December, 2008

JON W. DUDAS
*Director of the United States Patent and Trademark Office*